(12) United States Patent
Cacas et al.

(10) Patent No.: US 8,150,669 B2
(45) Date of Patent: Apr. 3, 2012

(54) METHOD OF SEEKING HYDROCARBONS IN A GEOLOGICALLY COMPLEX BASIN, BY MEANS OF BASIN MODELING

(75) Inventors: Marie-Christine Cacas, Rueil Malmaison (FR); Jean-Luc Rudkiewicz, Antony (FR); Isabelle Faille, Carriéres-sur-Seine (FR); Jean-Marc Daniel, Chatou (FR); Pascal Have, Rueil Malmaison (FR)

(73) Assignee: IFP, Cedex (FR)

( * ) Notice: Subject to any disclaimer, the term of this patent is extended or adjusted under 35 U.S.C. 154(b) by 389 days.

(21) Appl. No.: 12/425,495

(22) Filed: Apr. 17, 2009

(65) Prior Publication Data
US 2009/0265152 A1 Oct. 22, 2009

(30) Foreign Application Priority Data
Apr. 17, 2008 (FR) .................... 08 02132

(51) Int. Cl.
*G06G 7/58* (2006.01)
*G06F 19/00* (2011.01)
*G06T 17/20* (2006.01)
*G01V 1/00* (2006.01)

(52) U.S. Cl. ............. 703/10; 700/98; 345/423; 367/73; 367/74

(58) Field of Classification Search ................ 703/10; 700/98; 367/73, 74; 345/423
See application file for complete search history.

(56) References Cited

U.S. PATENT DOCUMENTS

| | | | | |
|---|---|---|---|---|
| 5,659,135 A | * | 8/1997 | Cacas ........................ | 73/152.02 |
| 5,661,698 A | * | 8/1997 | Cacas ........................... | 367/73 |
| 5,704,713 A | * | 1/1998 | Kim et al. ..................... | 374/136 |
| 5,999,485 A | * | 12/1999 | Anstey et al. .................. | 367/35 |
| 6,023,656 A | * | 2/2000 | Cacas et al. .................... | 702/12 |
| 6,516,292 B2 | * | 2/2003 | Yahalom .......................... | 703/9 |
| 6,662,147 B1 | * | 12/2003 | Fournier et al. ................ | 703/10 |
| 7,167,816 B1 | * | 1/2007 | Olovsson ......................... | 703/2 |
| 7,197,441 B2 | * | 3/2007 | Lee et al. ........................ | 703/10 |
| 7,283,911 B2 | * | 10/2007 | Fitzsimmons et al. .......... | 702/14 |
| 7,307,629 B2 | * | 12/2007 | Srivastava et al. ............ | 345/423 |

(Continued)

FOREIGN PATENT DOCUMENTS
WO WO 02/47011 A1 6/2002
(Continued)

OTHER PUBLICATIONS

European Patent Office Search report on EP 09290269, p. 1 with X reference, Jun. 13, 2009.*

(Continued)

*Primary Examiner* — Kamini S Shah
*Assistant Examiner* — Akash Saxena
(74) *Attorney, Agent, or Firm* — Antonelli, Terry, Stout & Kraus, LLP.

(57) ABSTRACT

A method for mapping a complex sedimentary basin is disclosed. A grid representative of the current architecture of the basin is constructed. A mechanical structural restoration is applied in three dimensions so as to reconstruct the past architectures of the basin from the current time up to a geological time t. A simulation of the geological and geochemical processes that govern the formation of a petroleum reservoir is then carried out, directly in the grids obtained from the restoration, from the geological time t to the current one. This simulation is thereafter used for mapping the sedimentary basin so as to identify zones of the basin where hydrocarbons may have accumulated.

41 Claims, 3 Drawing Sheets

U.S. PATENT DOCUMENTS

| | | | | |
|---|---|---|---|---|
| 7,523,024 | B2* | 4/2009 | Endres et al. | 703/10 |
| 7,565,276 | B2* | 7/2009 | Song et al. | 703/9 |
| 7,881,911 | B2* | 2/2011 | Kim et al. | 703/10 |
| 8,055,490 | B2* | 11/2011 | Kim et al. | 703/10 |
| 2002/0013687 | A1* | 1/2002 | Ortoleva | 703/10 |
| 2002/0016702 | A1* | 2/2002 | Manceau et al. | 703/10 |
| 2003/0216897 | A1* | 11/2003 | Endres et al. | 703/10 |
| 2004/0201585 | A1* | 10/2004 | Srivastava et al. | 345/423 |
| 2004/0220788 | A1* | 11/2004 | Assa et al. | 703/10 |
| 2006/0235666 | A1* | 10/2006 | Assa et al. | 703/10 |
| 2009/0171596 | A1* | 7/2009 | Houston | 702/45 |
| 2009/0216505 | A1* | 8/2009 | Sarma et al. | 703/2 |
| 2010/0211370 | A1* | 8/2010 | Maliassov | 703/10 |
| 2010/0223039 | A1* | 9/2010 | Maliassov | 703/10 |

FOREIGN PATENT DOCUMENTS

WO    WO 2006/113939 A1    10/2006

OTHER PUBLICATIONS

"A Numerical Model of Compaction-Driven Groundwater Flow and Heat Transfer and Its Application to the Paleohydrology of Intracratonic Sedimentary Basins" by Craig M. Bethke (1985) Journalo F Geophysical Research vol. 90, No. B8, pp. 6817-6828 July 10, 1985.*

"Mechanical and chemical compaction model for sedimentary basin simulators" by F. Schneider (1996) Tectonophysics 263 (1996) 307-317.*

"KINE3D: a New 3D Restoration Method Based on a Mixed Approach Linking Geometry and Geomechanics" by Moretti et al. (2006),Oil & Gas Science and Technology—Rev. IFP, vol. 61 (2006), No. 2, pp. 277-289.*

Single Medium Simulation of Reservoirs with Conductive Faults and Fractures, Paul van Lingen (Institut Français du Pétrole) et al., 2001 SPE Middle East Oil Show held in Bahrain, Mar. 17-20, 2001, pp. 1-7.*

An Integrated Workflow to Account for Multi-scale Fractures in Reservoir Simulation Models: Implementation and Benefits; Bernard Bourbiaux et al. SPE 2002 pp. 1-14.*

Database Inspec [Online] The Institution of Electrical Engineers, Stevenage, GB; 2003, Cao W. et al: "Approaches for Generating Moving Adaptive Meshes: Location Versus Velocity" XP002503847, Database accession No. 8076720, & $2^{ND}$ International Workshop on Numerical Linear Algebra, Numerical Methods for Partial Differential Equations and Optimization Aug. 20-23, 2001 Curitiba, Brazil, vol. 47, No. 2, 2003, pp. 121-138, Applied Numerical Mathematics Elsevier, Netherlands ISSN: 0168-9274, One page abstract only submitted.

Database Inspec [Online] The Institution of Electrical Engineers, Stevenage, GB; Apr. 10, 2002, Ruo Li et al: "A Moving Mesh Finite Element Algorithm for Singular Problems in Two and Three Space Dimensions", XP002503848, Database accession No. 7286234 & Journal of Computational Physics Academic Press USA, vol. 177, No. 2, Apr. 10, 2002, pp. 365-393, ISSN: 0021-9991, One page abstract only submitted.

* cited by examiner

METHOD OF SEEKING HYDROCARBONS IN A GEOLOGICALLY COMPLEX BASIN, BY MEANS OF BASIN MODELING

BACKGROUND OF THE INVENTION

1. Field of the Invention

The present invention relates to the field of petroleum exploration. Petroleum exploration consists in seeking hydrocarbon reservoirs in a sedimentary basin.

2. Description of the Prior Art

The general procedure comprises:

assessments and geological studies for evaluating the petroleum potential of the sedimentary basin, from available data (outcrops, seismic surveys, drilling data). The goal of this assessment is to:

- better understand the architecture and the geological history of the subsoil, notably to study whether hydrocarbon maturation and migration processes may have taken place;
- identify the subsoil zones where these hydrocarbons may have accumulated;
- establish which zones have the best economic potential, evaluated from the volume and the nature of the hydrocarbons probably trapped (viscosity, rate of mixing with water, chemical composition, . . . ), as well as their operating cost (controlled for example by the fluid pressure and depth); and
- exploratory drilling operations in the various zones having the best potential, in order to confirm or invalidate the previously estimated potential and to acquire new data intended to fuel new and more precise studies.

In some sedimentary basins having a complicated geological history involving many physical processes, or when the volume of data is very large, a simple human assessment intervention is not sufficient to predict the location and the economic interest of reservoirs. A procedure involving software tools of synthesis of the available data and of simulation of the geological history and of the many physical processes that govern it is then applied. This procedure is referred to as "basin modeling". It provides predictive mapping of the subsoil showing the probable location of the reservoirs, as well as the proportion, the nature and the pressure of the hydrocarbons trapped therein.

Understanding the principles of the genesis of hydrocarbons and their links with the geological history of the subsoil has allowed development of methods for predicting the petroleum potential and the location of reservoirs in sedimentary basins. These methods were based on geological observations made in the field, and expert geologists integrating their knowledge into a reasoning process intended to provide hypotheses for hydrocarbon formation, migration and trapping scenarios for each basin being studied. Exploratory drilling operations were then carried out according to their recommendations, with a success rate of the order of one reservoir discovery out of 10 wells drilled. The information provided by this assessment stage was essentially qualitative.

In the 80s, the development of computer science provided new tools for assisting geologists in this procedure, helping them to provide quantitative and more reliable data, and allowing them to thus increase this success rate. Many computer codes were developed so as to better apprehend and quantify each one of the geological phenomena governing the formation, migration and trapping of hydrocarbons. The following tools can be mentioned:

1. "structural restoration" softwares
2. "basin modeling" softwares.

Structural Restoration

The goal of structural restoration softwares is to construct, visualize and validate a hypothesis relative to the current architecture of the subsoil and to its evolution over the past geological time. The subsoil architecture is described by the shape and the position of the faults and of the interfaces separating the main sedimentary layers (FIG. 1). A structural restoration study is for example started when only imprecise fragmentary data is available on this architecture: geological field observations, seismic surveys or data acquired along wellbores. Schematically, restoration softwares have the functionalities of an interactive online puzzle, in 2 or 3 dimensions. The subsoil is currently assumed to be made up of contiguous, surface or volume elements; the contours of these elements correspond to the sedimentary interfaces and to the faults. Structural restoration reconstructs the successive states of the subsoil architecture during its geological history, starting from its current architecture and going back in time. The architecture of the past states is reconstructed by deforming these elements from their current state, then by displacing them and by arranging them in relation to one another according to the deformation scenario envisaged by the geologist. This tool allows:

- converting a conceptual scenario obtained from geological interpretation to a numerically quantified scenario, reproduced by computer;
- validating this scenario: the basic validation criterion essentially checks that the scenario envisaged does not violate the condition of perfect contact between the elements; in fact, the presence of vacuum or overlapping between subsoil elements is not physically allowable and invalidates the hypothesis tested.

Restoration softwares work according to one or the other of the following principles:

1. Restoration by kinematic approach, which applies geometrical transformations to the elements so as to reconstruct the various stages of the deformation. The geometrical transformations applied are calculated or defined by the user, so as to respect the conservation of the volumes (or of the surfaces in 2 dimensions) and contact between the elements, 2. Restoration by a mechanical approach, which simulates the subsoil deformation by discretization, then solution of the equations of the mechanics of continuous media. For the purpose of this restoration, the medium is assumed to behave like a quasi-incompressible elastic material; the faults are represented as inner surfaces along which a perfect contact condition applies, without friction. Under such conditions, the calculated displacements and deformations are perfectly reversible, that is the calculation provides the same result whether starting from the final state and going back in time, or starting from the initial state and simulating the deformations in the normal chronological order.

Basin Modeling

Basin modeling softwares allow simulation in one, two or three dimensions all of the sedimentary, tectonic, thermal, hydrodynamic and organic chemistry processes involved in the formation of a petroleum basin. The procedure followed by most basin models comprises three stages:

1. A stage of constructing a grid of the subsoil as it is currently assumed to be, according to a hypothesis on its inner architecture and on the properties that characterize each grid cell: for example their porosity, their sedimentary nature (clay, sand, . . . ) or their organic matter content at the time of their sedimentation. The construction of this model is based on data acquired through seismic surveys or measurements while drilling, 2. A stage of reconstructing the prior stages of the basin architecture, based on the hypothesis according to which its deformation only results from a combination of vertical movements by compaction of the sediment or upheaval of its basement. This stage is referred to as backstripping (Steckler, M. S., and A. B. Watts, Subsidence of the Atlantic-type continental margin off New York, Earth Planet. Sci. Lett., 41, 1-13, 1978). It is based on the vertical preservation hypothesis: any vertical segment passing through the basin remains along the same vertical line during the deformation; its length and depth point however evolve over time under the effect of the compaction of the formations and of the subsidence of the basin. It is a form of kinematic restoration that is valid only for the simplest cases of tectonic context;

3. A stage of numerical simulation of a selection of physical phenomena taking place during the basin evolution and contributing to the formation of oil traps.

A basin model is a fundamental tool for exploration because it provides all the data required for prediction of the location of reservoirs and of their economic interest.

The basin simulators (softwares) currently available are essentially limited to the hypothesis that the deformation of the basin being studied is correctly represented by backstripping, that is all the deformations can be reasonably represented by vertical movements, without penalizing the reliability of the results. However, many basins actually have a "complex" architecture and tectonic history for which this hypothesis is no longer acceptable; in this context, using a basin model in simple geometry can lead to errors on the prediction of traps. For example, the landslide along some sub-horizontal sedimentary interfaces (referred to as detachment in geology) illustrates the limits of simulations in a simple geometry context. Detachments are very frequent phenomena in the bow areas of the globe. Detachments "shear" the vertical lines of the basin; the subsoil portions located above the detachment are transported horizontally so as to be superposed on others: the vertical preservation condition is no longer valid. This phenomenon can greatly control the current position of the traps. Thus, a vertical migration path can successively fill several reservoirs which are thereafter transported by a horizontal movement to another zone of the basin.

SUMMARY OF THE INVENTION

The invention relates to an alternative basin modeling method, particularly suited for the exploration of basins that have undergone fractures during their history, which uses the results of a mechanical structural restoration to carry out petroleum system simulations.

The method according to the invention allows mapping of a sedimentary basin comprising sedimentary layers and fractures, whose architecture and layer nature result from a deformation of the subsoil over geological time, between a geological time t and the current time. According to this method, a grid representative of the current architecture of the basin is constructed and the following stages are carried out:

past architectures of the basin are reconstructed, from the current time to the geological time t, by deforming the grid so as to construct a succession of Lagrangian grids, by means of a three-dimensional structural restoration wherein the deformation of the basin is calculated by solving equations of the continuous media mechanics using a finite-element method;

a simulation of the geological and geochemical processes that govern the formation of a petroleum reservoir is carried out, the simulation being performed in the Lagrangian grids from the geological time t to the current one; and mapping of the sedimentary basin is performed from the simulation, so as to identify zones of the basin wherein hydrocarbons may have accumulated.

According to the invention, the structural restoration can comprise a stage of correction of the Lagrangian grids by adding layers of cells representing eroded sediments, or by removing an upper layer of cells representing a sediment deposited during a prior stage.

The structural restoration can also comprise a stage of correction of the Lagrangian grids wherein a vertical displacement of the nodes is incremented, this displacement being calculated according to a depth-dependent law, so as to take account of the decompaction of the sediment during a prior stage.

The geological and geochemical processes can be selected from among the following processes: process of deposition of the sedimentary layers, compaction of the sedimentary layers under the effect of the weight of overlying sediments, warming of the sedimentary layers during burial, fluid pressure changes resulting from the burial, chemical transformation of organic matter to hydrocarbons, displacement of the hydrocarbons in the basin under the effect of floatability, capillarity and advection through underground flows, and trapping of the hydrocarbons in reservoirs.

According to the invention, a subgrid can be constructed at the level of slip interfaces, such as faults or detachments, so that one face of a grid cell on one side of the interface is in contact with a single face of a cell located on the other side. It is also possible to supplement the Lagrangian grids with two layers of cells added along slip interfaces, by duplicating on each side of the interface the cells of the Lagrangian grid while ensuring coincidence of the cells on each side of the interface, and by assigning to the cells of the two layers a quasi-zero thickness, so as to take account of an anisotropic behaviour of the slip interfaces.

Finally, the invention also relates to a petroleum exploration method wherein the location of hydrocarbon reservoirs and their economic interest within a sedimentary basin is predicted by means of the following stages:

data relative to the sedimentary basin are acquired;

mapping of the basin is achieved by means of the mapping method according to the invention;

zones of the basin wherein hydrocarbons may have accumulated are identified by analysis of said mapping; and exploratory drilling operations are carried out in the zones.

BRIEF DESCRIPTION OF THE DRAWINGS

Other features and advantages of the method according to the invention will be clear from reading the description hereafter of embodiments given by way of non limitative example, with reference to the accompanying figures wherein:

FIG. 4 is a cutaway view of the grid corefinement used to solve the problem of the non-coincidence of the grids on either side of a fault or of a detachment by finite-volume discretization. FIG. 5 is a diagram describing the gridding of the fault surfaces.

DETAILED DESCRIPTION OF THE INVENTION

Figure 1:
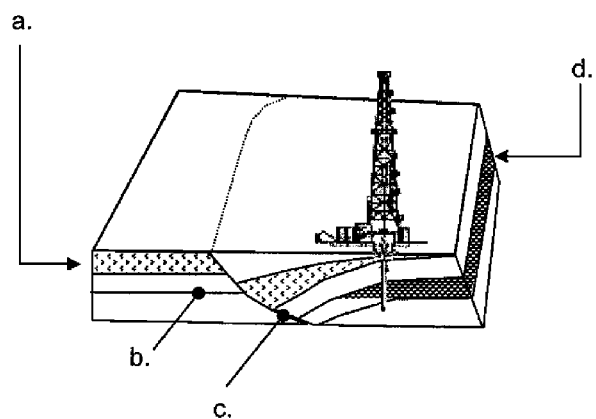
FIG. 1 diagrammatically shows the subsoil of a petroleum basin.

The method according to the invention allows mapping of a sedimentary basin comprising sedimentary layers and fractures. The architecture and the nature of the sedimentary layers of this basin, as they can be currently observed, result from a deformation of the subsoil over geological time, between a geological time t and the current time. FIG. 1 diagrammatically shows the subsoil of a petroleum basin, with:
  a. a geological layer
  b. a sedimentary interface
  c. a fault surface (slip interface)
  d. a hydrocarbon accumulation in a geological layer.

The method comprises a typically three-dimensional basin modeling technique applicable to the search for petroleum traps in complex tectonic contexts. It comprises the following three stages:

1. A stage of construction of a grid of the sedimentary basin, as it is assumed to be today. This grid is kept for the next two stages;

2. A stage of three-dimensional restoration based on the aforementioned grid, and which does not presuppose preservation of the verticals over the course of the geological history. This restoration deforms the grid obtained in stage 1 and reconstructs the deformation history in anti-chronological order. The dynamic grid obtained is a Lagrangian grid, that is each node remains linked to the same material point during the deformation; and 3. Simulation of the geological and geochemical processes over geological time in chronological order, by discretization and solution of the physics equations in the Lagrangian grid of stage 2, to which "backward" dynamics is applied: the grid of the initial state corresponds to the final state of the grid of stage 2; it evolves towards its final state that corresponds to the initial state of the grid of stage 2.

Stage of Construction of a Grid of the Sedimentary Basin

Constructing a grid representative of the basin architecture as it is assumed to be today discretizes in three dimensions the subsoil architecture as it is currently assumed to be. The following conditions are preferably met to guarantee the quality of the results obtained in the following stages:

Use of a grid referred to as a "mixed" grid, predominantly having hexahedric cells. Cells with less than six faces can however be used locally when required by the geological complexity;

These hexahedra are constructed in such a way that two opposite faces among the six coincide with sedimentary interfaces. The result is optimum when the other four faces are sub-perpendicular to these sedimentary interfaces. Thus, each sedimentary layer is represented by a single layer of cells whose shape best approximates that of a square block;

The grid respects the surfaces that make up the faults or the sedimentary interfaces, that is these surfaces must not be crossed by any cell;

On the surfaces that have undergone a slip during the deformation, coincidence of the cells is not required. It is obligatory elsewhere. A grid is referred to as coincident when all the cells share the same faces and no edge stops on a face.

Figure 2:
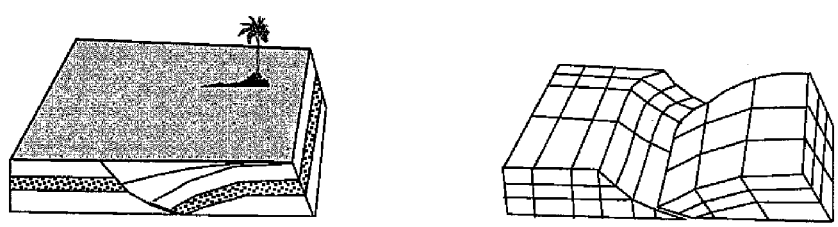
FIG. 2 is a cutaway view of a "Generalized Corner Point" type grid of the basin shown in FIG. 1.

The grids referred to as generalized corner points by specialists are a particular case of the grid described above. They can be constructed from grid tools used in known geomodeling softwares. FIG. 2 illustrates, on the left, an example of a sedimentary basin and, on the right, an example illustrating this grid type.

Structural Restoration Stage

Figure 3:
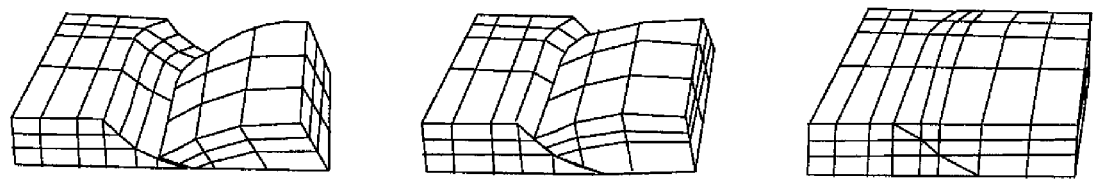
FIG. 3 shows a backward kinematic model of the deformation of the basin of FIG. 1, represented by 3 deformation states.

In this stage, past architectures of the basin, from the current time to a geological time t, prior to the current one, are reconstructed. The grid constructed in the previous stage is therefore deformed in order to represent the anti-chronological evolution of the subsoil architecture over geological time. This deformation is represented by the succession of a discrete number of Lagrangian grids representing different states of the grid. A grid is referred to as Lagrangian when each node of the grid is linked to a material point of the subsoil and follows it during the deformations. In the example of FIG. 3, three states are used to represent the subsoil deformation over geological time. The left grid shows the current state, where a slip interface (a fault here) can be observed. The right grid shows the same sedimentary basin at a geological time t, prior to the current one. At this time t, the sedimentary layers are not fractured. The grid of the basin is an intermediate state, that is it represents the sedimentary basin at a time t' ranging between time t and the current time. It can be observed that the slip has started modifying the basin architecture.

To carry out this stage, a structural restoration technique by mechanical approach is used: the basin deformation is calculated by space discretization and solution of the equations of the mechanics of continuous media by means of a finite-element method. More precisely, the basin deformation is calculated by solving the mechanical equilibrium between the stresses $\sigma$ and the forces applied at the boundaries f of the modeled domain $\Omega$: $\text{div}\sigma = f$; and the medium is assumed to behave elastically.

Such a structural restoration is for example described in the following document: I. Moretti, F. Lepage et M. Guiton, "KINE3D: A New 3D Restoration Method Based on a Mixed Approach Linking Geometry and Geomechanics", Oil & Gas Science and Technology—Rev. IFP, Vol. 61 (2006), no 2, pp. 277-289.

The grid of the basin at the initial time is the one obtained in the previous stage. The rock is represented by a quasi-incompressible elastic material. The boundary conditions at the simulated domain boundary are expressed in terms of imposed displacements, defined by the user at the calculation input. For each state of the grid, the simulation calculates the new position of the nodes so as to ensure mechanical equilibrium of the medium, respect of the displacements imposed at the boundaries. Besides, a perfect contact condition is imposed along the slip surfaces. This implies that, along the contact between the two walls of a fault, all the nodes of the grid belonging to one of the walls are in contact with the free face of a cell belonging to the opposite wall.

When calculation of a state is complete, it may be necessary to correct the grid obtained prior to calculating the next state, in order to take account of a sedimentary deposit or erosion. In the case of erosion, this intervention adds the cell layers representing the sediments eroded during the stage that has just been considered. In the case of deposition, the intervention removes the upper cell layer, which represents the sediment deposited during the stage that has just been considered.

Finally, a last grid correction can be performed to account for the sediment decompaction during the stage that has just been considered (decompaction because an anti-chronological order is adopted). A vertical node displacement increment is calculated according to a depth-dependent law, in a similar way to what is performed in a backstripping stage.

Petroleum System Simulation Stage

During this stage, all of the sedimentary, tectonic, thermal, hydrodynamic and organic chemistry processes involved in the formation of a petroleum basin are simulated. The geological and geochemical processes that govern the formation of a petroleum system are notably simulated in chronological order, by discretization and solution of the physics equations of these processes in the Lagrangian grids of the restoration stage (stage 2), to which "backward" dynamics is applied: the grid of the initial state corresponds to the final state of the grid of stage 2; it evolves towards its current state which corresponds to the initial state of the grid of stage 2.

The simulation principles are those of a discretization and of a solution of the system of differential equations describing the evolution of the physical quantities studied. For this stage, it is possible to use, for example, a discretization by means of the finite-volume method, as described for example in "R. Scheichl, R. Masson, J. Wendebourg, Decoupling and Block Preconditioning for Sedimentary Basin Simulations, Computational Geosciences 7(4), pp. 295-318, 2003".

This method is particularly well suited for simulation of the migration of hydrocarbons. It is notably more efficient than the finite-element discretization for the simulation of multiphase flows, as shown in document "The Finite Volume Method, R. Eymard, T. Gallouet, R. Herbin, Handbook for Numerical Analysis, Ph. Ciarlet J. L. Lions eds, North Holland, 2000".

Taking Account of Deformations Between Two States

Simulations are carried out in a dynamic grid context, that is it undergoes deformations over time, imposed at the calculation input. An "event" corresponds to all of the processes taking place between two successive states of the grid resulting from the 3D restoration. For the purpose of simulation, the event is discretized in time intervals and the equations are solved at each time interval. In order to take account of the basin architecture at each time interval, a linear interpolation is carried out between the two states of the Lagrangian grids resulting from the restoration. At a time $t+\alpha \cdot \Delta t$ (where $0<\alpha<1$) of the event corresponding to the time interval $[t, t+\Delta t]$, the position of each node M of the grid is given by:

$$M_t M = \alpha M_t M_{t+\Delta t}$$

Simulation of the Processes

As described above, a finite-volume discretization can be selected, whose basic principles are for example described in "The finite volume method, R. Eymard, T. Gallouet, R. Herbin, Handbook for Numerical Analysis, Ph. Ciarlet J. L. Lions eds, North Holland, 2000". The finite-volume method was initially designed for a discretization of the medium into cells in a form of square blocks. It thereafter evolved so as to use a grid made up of cells of any shape. The same document (pp. 715-1022) gives a detailed description of this method applied to cells of any shape.

According to the principle of the cell-centered finite-volume methods, the unknowns are discretized by a constant value per cell and the (mass or heat) conservation equations are integrated in space on each cell and in time between two successive instants. The discrete equations then express that the quantity conserved in a cell at a given time is equal to the quantity contained in the cell at the previous time, increased by the quantity fluxes that have entered the cell and decreased by the quantity fluxes that have left the cell through its faces, plus the external supplies. The geometrical evolution of the cell is naturally accounted for in this discretization. The quantities contained in each cell are approximated by their value in the cell, multiplied by the volume of the cell, thus bringing the discretization back to the approximation of diffusive fluxes on each face of the grid. Various flux discretization schemes are applicable, depending on the desired accuracy. The simplest is the two-point scheme that approximates the flux on a face only according to the unknowns in the two neighboring cells of the face. Although not very precise in a homogeneous medium, this scheme allows capturing the essential part of the solution in a heterogeneous medium. It can be replaced by more precise schemes, in particular those of the MPFA schemes family introduced by I. Aavatsmark (I. Aavatsmark, G. T. Eigestad, B. T. Mallison, J. M. Nordbotten: A compact multipoint flux approximation method with improved robustness, Numerical Methods for Partial Differential Equations and references mentioned in the article), which allow improvement of the precision of the solutions but involve a higher calculating cost. The time discretization is implicit, thus allowing to use relatively large time intervals.

Calculation of the vertical stress (weight of the sediments) on an unstructured grid with no privileged direction requires a different approach in relation to that used when the grid is not based on columns of vertical edges. The vertical stress is thus approximated at the nodes of the grid, and the discretization of the vertical mechanical equilibrium by decentered finite differences allows expressing the stress at a node as a function of the stresses of its upper neighboring nodes and of the weight of the upper neighboring cells.

As in simple geometry, the algebraic system obtained at each time interval couples the pressure and vertical stress unknowns in the entire grid and it is solved by standard or specific linear system solution techniques ("R. Scheichl, R. Masson, J. Wendebourg, Decoupling and Block Preconditioning for Sedimentary Basin Simulations, Computational Geosciences 7(4), pp. 295-318, 2003").

Sedimentary Basin Mapping

After this stage of simulation of the geological and geochemical processes over geological time and in chronological order, we have data about, for example:

i. The process of deposition of the sedimentary layers ii. Their compaction under the effect of the weight of the overlying sediments iii. Their warming during burial iv. The fluid pressure changes resulting from this burial v. The chemical transformation of the organic matter to hydrocarbons, vi. The displacement of these hydrocarbons in the basin under the effect of floatability, capillarity and advection through underground flows vii. The trapping of hydrocarbons in reservoirs.

Precise mapping of the sedimentary basin can then be achieved, describing both its architecture respecting a scenario of geological deformation over geological time and the nature of the sedimentary layers.

Such mapping then allows determination of the probable location of petroleum reservoirs in the basin, as well as the proportion, the nature and the pressure of the hydrocarbons trapped therein, and therefore to define the location of exploratory drilling and production sites.

Variants

Taking Account of the Non-Coincidence of the Grid Cells Along Faults or Detachment Levels In conventional basin simulators, the faults are dealt with in a very simplified manner. They are represented by a column of cells according to the representation of FIG. 5A. In the case of permeable faults, a high permeability is assigned to these cells; in the extreme, a hydrostatic pressure condition is applied in the fault, which amounts to disregarding any pressure drop due to the circulation in the fault plane. On the other hand, when the fault is impermeable, an internal zero-flow condition is imposed along the faces of the fault cells. This simplistic modeling of the role of the faults does not allow taking rigorous account of the flow physics. For example, it does not allow taking account of a direct flow between two initially separate cells brought into contact through the displacement along the faults.

The restoration stage of the method according to the invention is characterized, among other things, by the fact that the basin deformation scenario allows progressive slip along interfaces consisting of the faults or the detachments during the period simulated. This however generates a non-coincidence of the grid cells on either side of the interfaces: one face of a cell of a wall can be in contact with several faces of cells located on the other wall. In other words, the nodes located at the corners of the cells of a face do not coincide with the nodes located at the corners of the cells of the face in contact. Now, conventionally, discretization of the equations that govern fluid and heat transfers by means of a finite-volume method only apply to coincident polyhedric cells.

Figure 4A:
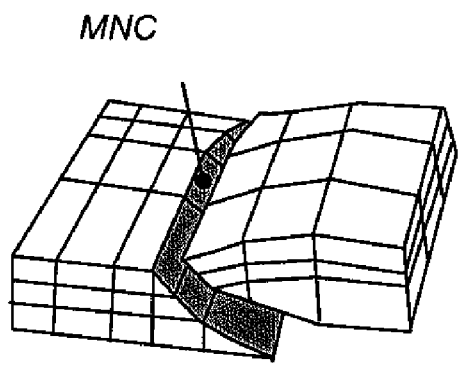
FIG. 4A shows two blocks in contact but gridded by means of non-coincident grids.
Figure 4B:
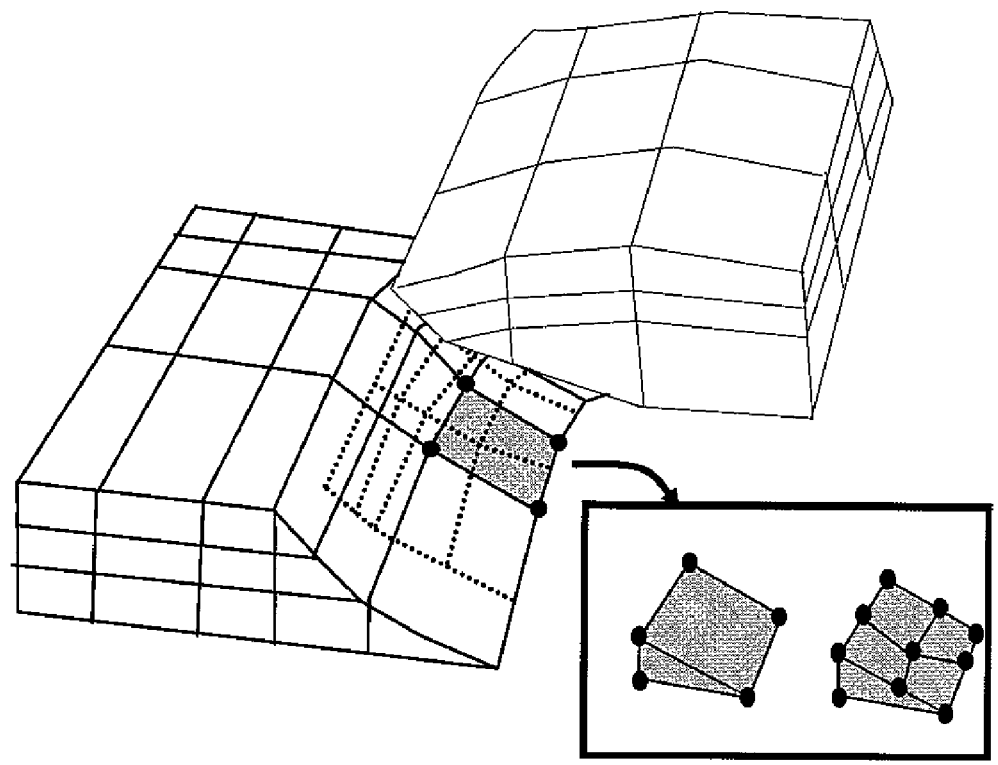
FIG. 4B illustrates the grid refinement performed on a cell.

In order to be able to use the finite-volume formalism within the context of a non-coincident grid, while ensuring that fluid or heat transfers through the non-coincident surfaces associated with the faults are conservative (that is without mass or heat loss) and actually take account of the petrophysical properties variations on either side of the interface, a principle that constructs a subgrid of the non-coincident grid, so as to meet the coincidence conditions, is adopted. This subgrid is calculated at each displacement increment while keeping the number and the geometry of the cells, and by adding nodes so as to subdivide the faces into coincident subfaces as shown in FIG. 4B. This subgrid is obtained by superimposing the two non-coincident grids (MNC—FIG. 4A). These two grids are made up of the cells on either side of the fault. The equations are then referred to as discretized on a corefinement of the surface grids of the two walls. Corefinement is defined as a surface grid representing the fault surface in such a way that each corefined face is located opposite a single face on each wall. An algorithm allowing to determine a corefinement is for example given in "Overlaying Surface Meshes, Part I: Algorithms. X. Jiao and T. Heath. International Journal of Computational Geometry & Applications. Vol 14, No 6 (2004) 379-402".

Taking account of the anisotropic behavior of faults

It is also known that some faults are known to constitute a tight barrier impervious to crossflows through clogging of their faces, while forming a very efficient drain in the longitudinal direction when the faces do not perfectly stick to one another. Once again, this phenomenon cannot be simulated in the conventional approach illustrated in FIG. 5A.

In a complex tectonic context, characterized by the development of many faults, it is fundamental to precisely model this phenomenon because it can greatly control the overpressure relaxation and the location of hydrocarbon accumulations.

Figures 5A, 5B:
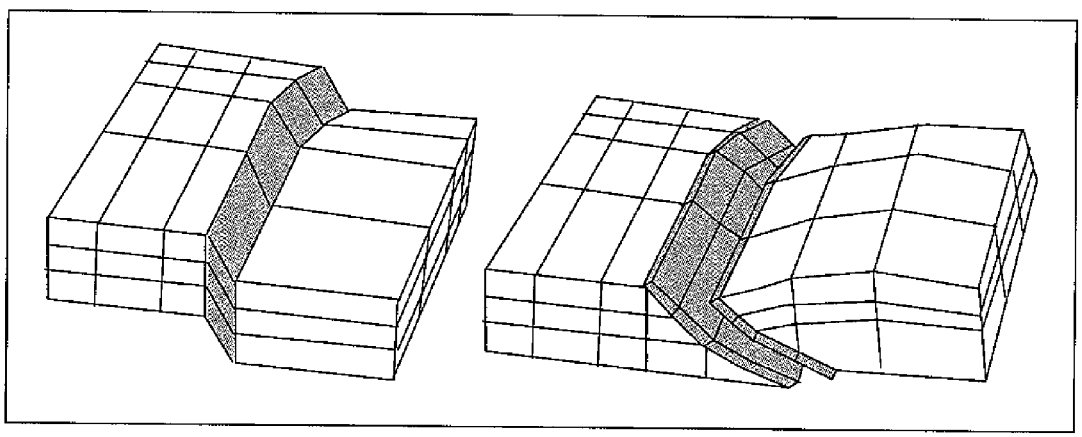
FIG. 5A illustrates accounting for the faults in the basin models based on a "conventional" finite-volume discretization.
FIG. 5B illustrates the accounting for the faults according to the method of the invention. The shaded cells are used to discretize the hydrodynamism associated with the fault.

In order to take this into account, the faults are represented according to the following method. The grid is complemented by two layers of cells added along each fault wall. Numerically, they are cells of negligible thickness, perfectly coincident with their neighbor on the wall to which they are linked, as shown in FIG. 5B. They simulate a volume of altered rock that conventionally runs alongside fault surfaces, of very small thickness at the scale of the basin studied, but preponderant for flows. In the calculations, these cells can normally exchange fluids with the cells beside which they are located, and also with those located on the opposite wall through the agency of a corefinement carried out according to the method described above. The permeability tensor assigned to these cells is a simulation input datum; a very high anisotropy can be imposed thereon to take account for example of a high permeability in the longitudinal direction (flow in the fault) and of a low or even zero permeability in the transverse direction so as to account for a fault wall made impermeable by mineral deposits.

This method of taking the faults into account does not require profound changes in the grid since the layer of "fault" cells is obtained by duplicating the walls grid. The external face of these fault cells is subsequently corefined according to the above method if a fluid exchange between the two walls is to be taken into account.

Numerically, the new "fault" cells are dealt with in the same way as all the other cells of the simulated domain.

Applications

Petroleum exploration seeks hydrocarbon reservoirs in a sedimentary basin. According to the invention, the location of hydrocarbon reservoirs and their economic interest within a sedimentary basin can be predicted by mapping said basin from the method of the invention.

The exploration method then comprises the following stages:

data relative to the sedimentary basin to be studied are acquired: outcrops, seismic surveys, drilling data, from the available data, mapping of the sedimentary basin is achieved so as to determine the architecture and the geological history of the subsoil, and one notably studies whether hydrocarbon maturation and migration processes may have taken place, subsoil zones where these hydrocarbons may have accumulated are identified by analyzing the map thus obtained, zones having the best economic potential are defined, evaluated from the volume and the nature of the hydrocarbons probably trapped (viscosity, rate of mixing with water, chemical composition, . . . ), as well as their operating cost (controlled for example by the fluid pressure and depth), exploratory drilling operations in the various zones having the best potential are carried out in order to confirm or invalidate the previously estimated potential and to acquire new data intended to fuel new and more precise studies.

The invention claimed is:

1. A method of mapping a sedimentary basin comprising sedimentary layers and fractures, including an architecture and layer nature resultant from a deformation of subsoil over geological time, between a geological time t and a current time, with a grid representative of a current architecture of the basin being constructed, comprising the steps:

constructing past architectures of the basin, from the current time to the geological time t, by deforming the grid to construct a succession of Lagrangian grids, using a three-dimensional structural restoration wherein the deformation of the basin is calculated by solving equations representing continuous media mechanics using a finite-element method;

simulating geological and geochemical processes governing formation of a petroleum reservoir, the simulation being performed in the Lagrangian grids from the time to the geological time t; and mapping the sedimentary basin from the simulation to identify zones of the basin where hydrocarbons may have accumulated.

2. A method as claimed in claim 1, wherein:

the Lagrangian grids comprise nodes with each node remaining linked to a same material point during the deformation.

3. A method as claimed in claim 1, wherein:
the structural restoration comprises correcting the Lagrangian grids by adding layers of cells representing eroded sediments, or by removing an upper layer of cells representing a previously deposited sediment.

4. A method as claimed in claim 3, wherein:
the structural restoration comprises correction of the Lagrangian grids including incrementing a vertical displacement of nodes, the vertical displacement being in accordance with a depth-dependent law for accounting for previous decompaction of the sediment prior stage.

5. A method as claimed in claim 4, wherein:
the geological and geochemical processes are selected from among a process of deposition of the sedimentary layers, compaction of the sedimentary layers under an effect of weight of overlying sediments, warming of the sedimentary layers during burial, fluid pressure changes resulting from burial of the sedimentary layers, chemical transformation of organic matter into hydrocarbons, displacement of the hydrocarbons in the basin under an effect of floatability, capillarity and advection through underground flows, and trapping of the hydrocarbons in reservoirs.

6. A method as claimed in claim 5, comprising:
constructing a subgrid at a level of slip interfaces, including faults or detachments, so that one face of a cell on one side of a slip interface is in contact with a single face of a cell located on another side of the slip interface.

7. A method as claimed in claim 6, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

8. A method as claimed in claim 5, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

9. A method as claimed in claim 4, comprising:
constructing a subgrid at a level of slip interfaces, including faults or detachments, so that one face of a cell on one side of the a slip interface is in contact with a single face of a cell located on another side of the slip interface.

10. A method as claimed in claim 9, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

11. A method as claimed in claim 4, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

12. A method as claimed in claim 3, wherein:
the geological and geochemical processes are selected from among a process of deposition of the sedimentary layers, compaction of the sedimentary layers under an effect of weight of overlying sediments, warming of the sedimentary layers during burial, fluid pressure changes resulting from burial of the sedimentary layers, chemical transformation of organic matter into hydrocarbons, displacement of the hydrocarbons in the basin under an effect of floatability, capillarity and advection through underground flows, and trapping of the hydrocarbons in reservoirs.

13. A method as claimed in claim 12, wherein:
the Lagrangian grids comprise nodes with each node remaining linked to a same material point during the deformation.

14. A method as claimed in claim 12, comprising:
constructing a subgrid at a level of slip interfaces, including faults or detachments, so that one face of a cell on one side of a slip interface is in contact with a single face of a cell located on another side of the slip interface.

15. A method as claimed in claim 14, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

16. A method as claimed in claim 12, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

17. A method as claimed in claim 3, comprising:
constructing a subgrid at a level of slip interfaces, including faults or detachments, so that one face of a cell on one side of a slip interface is in contact with a single face of a cell located on another side of the slip interface.

18. A method as claimed in claim 17, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

19. A method as claimed in claim 3, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

20. A method as claimed in claim 19, wherein:
the Lagrangian grids comprise nodes with each node remaining linked to a same material point during the deformation.

21. A method as claimed in claim 3, wherein:
the Lagrangian grids comprise nodes with each node remaining linked to a same material point during the deformation.

22. A method as claimed in claim 1, wherein:
the structural restoration comprises correction of the Lagrangian grids including incrementing a vertical displacement of nodes, the vertical displacement being in accordance with a depth-dependent law for accounting for previous decompaction of the sediment prior stage.

23. A method as claimed in claim 22, wherein:
the geological and geochemical processes are selected from among a process of deposition of the sedimentary layers, compaction of the sedimentary layers under an effect of weight of overlying sediments, warming of the sedimentary layers during burial, fluid pressure changes resulting from burial of the sedimentary layers, chemical transformation of organic matter into hydrocarbons, displacement of the hydrocarbons in the basin under an effect of floatability, capillarity and advection through underground flows, and trapping of the hydrocarbons in reservoirs.

24. A method as claimed in claim 23, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

25. A method as claimed in claim 23, comprising:
constructing a subgrid at a level of slip interfaces, including faults or detachments, so that one face of a cell on one side of a slip interface is in contact with a single face of a cell located on another side of the slip interface.

26. A method as claimed in claim 25, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

27. A method as claimed in claim 22, comprising:
constructing a subgrid at a level of slip interfaces, including faults or detachments, so that one face of a cell on one side of a slip interface is in contact with a single face of a cell located on another side of the slip interface.

28. A method as claimed in claim 27, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

29. A method as claimed in claim 22, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

30. A method as claimed in claim 22, wherein:
the Lagrangian grids comprise nodes with each node remaining linked to a same material point during the deformation.

31. A method as claimed in claim 1, wherein:
the geological and geochemical processes are selected from among a process of deposition of the sedimentary layers, compaction of the sedimentary layers under an effect of weight of overlying sediments, warming of the sedimentary layers during burial, fluid pressure changes resulting from burial of the sedimentary layers, chemical transformation of organic matter into hydrocarbons, displacement of the hydrocarbons in the basin under an effect of floatability, capillarity and advection through underground flows, and trapping of the hydrocarbons in reservoirs.

32. A method as claimed in claim 31, comprising:
constructing a subgrid at a level of slip interfaces, including faults or detachments, so that one face of a cell on one side of a slip interface is in contact with a single face of a cell located on another side of the slip interface.

33. A method as claimed in claim 32, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

34. A method as claimed in claim 31, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

35. A method as claimed in claim 31, wherein:
the Lagrangian grids comprise nodes with each node remaining linked to a same material point during the deformation.

36. A method as claimed in claim 1, comprising:
constructing a subgrid at a level of slip interfaces, including faults or detachments, so that one face of a cell on one side of a slip interface is in contact with a single face of a cell located on another side of the slip interface.

37. A method as claimed in claim 36, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

38. A method as claimed in claim 36, wherein:
the Lagrangian grids comprise nodes with each node remaining linked to a same material point during the deformation.

39. A method as claimed in claim 1, wherein:
the Lagrangian grids are complemented with two layers of cells added along slip interfaces by duplicating on each side of the slip interfaces the cells of the Lagrangian grid while ensuring coincidence of the cells on each side of the slip interfaces, and by assigning to the cells of the two layers of cells a thickness accounting for an anisotropic behavior of the slip interfaces.

40. A petroleum exploration method for predicting location of hydrocarbon reservoirs and an economic interest of the reservoirs within a sedimentary basin comprising:
acquiring data relative to the sedimentary basin;
mapping the sedimentary basin comprising sedimentary layers and fractures, including an architecture and layer nature resultant from a deformation of subsoil over geological time, between a geological time t and a current time, wherein a grid representative of a current architecture of the basin is constructed comprising constructing past architectures of the basin, from the current time to the geological time t, by deforming the grid to construct a succession of Lagrangian grids, using a three-dimensional structural restoration wherein the deformation of the basin is calculated by solving equations representing continuous media mechanics using a finite-element method, simulating geological and geochemical processes governing formation of a petroleum reservoir, the simulation being performed in the Lagrangian grids from the current time to the geological time t, and mapping the sedimentary basin from the simulation to identify zones of the basin where hydrocarbons may have accumulated;

analyzing the mapping to identify zones of the basin where hydrocarbons may have accumulated; and carrying out drilling in the zones.

41. A method as claimed in claim 40, wherein:

the Lagrangian grids comprise nodes with each node remaining linked to a same material point during the deformation.

* * * * *